(12) United States Patent
Smith et al.

(10) Patent No.: US 7,057,515 B2
(45) Date of Patent: Jun. 6, 2006

(54) PET-ACTIVATED SIGNALING ASSEMBLY

(75) Inventors: Mark Smith, Salt Lake City, UT (US); George Roumpos, Murray, UT (US); Gary Bussey, Boynton Beach, FL (US); Tracy Bussey, Boynton Beach, FL (US)

(73) Assignee: Pende, Inc., Murray, UT (US)

( * ) Notice: Subject to any disclaimer, the term of this patent is extended or adjusted under 35 U.S.C. 154(b) by 76 days.

(21) Appl. No.: 10/843,712

(22) Filed: May 12, 2004

(65) Prior Publication Data

US 2004/0233059 A1 Nov. 25, 2004

Related U.S. Application Data

(60) Provisional application No. 60/470,482, filed on May 13, 2003.

(51) Int. Cl.
*G08B 23/00* (2006.01)

(52) U.S. Cl. .............................. 340/573.1; 340/573.3; 119/61; 119/712

(58) Field of Classification Search ............ 340/573.1, 340/573.2, 573.3, 331, 333; 119/61, 72, 119/707, 712, 719, 720
See application file for complete search history.

(56) References Cited

U.S. PATENT DOCUMENTS

| | | | |
|---|---|---|---|
| 917,991 A | 4/1909 | Bissonnette | |
| 1,018,444 A | 2/1912 | Ritchel ......................... 109/39 |
| 1,118,283 A | 11/1914 | Holdefer .................. 340/573.3 |
| 1,331,694 A | 2/1920 | Butcher et al. ................ 116/99 |
| 2,554,728 A | 5/1951 | Barber ..................... 340/573.2 |
| 2,608,612 A | 8/1952 | Merola ..................... 340/393.2 |
| 3,111,608 A | 11/1963 | Boenning et al. ........... 340/331 |
| 3,656,141 A | 4/1972 | Hill ......................... 340/573.1 |
| 3,952,295 A | 4/1976 | Luisada et al. ........... 206/459.1 |
| 4,188,622 A | 2/1980 | Miller et al. ................. 340/571 |
| 4,217,575 A | 8/1980 | Lorette .................... 340/573.3 |
| 4,400,696 A | 8/1983 | Klingensmith ........... 340/573.3 |
| 4,506,257 A | 3/1985 | Roberts .................... 340/573.2 |
| 4,551,713 A | 11/1985 | Aossey ....................... 340/666 |
| 4,658,386 A | 4/1987 | Morris ..................... 340/573.2 |
| 4,686,504 A | 8/1987 | German ...................... 340/328 |
| 4,780,706 A | 10/1988 | Bollag ....................... 340/666 |
| 4,924,214 A | 5/1990 | Hill ............................ 340/666 |
| 5,016,262 A | 5/1991 | Cushing ...................... 377/15 |
| 5,038,703 A | 8/1991 | Frush ......................... 116/170 |
| 5,057,819 A | 10/1991 | Valenti .................... 340/573.1 |
| 5,210,528 A | 5/1993 | Schulman et al. .......... 340/666 |
| 5,303,677 A | 4/1994 | Jones ........................ 119/174 |

(Continued)

*Primary Examiner*—Van T. Trieu
(74) *Attorney, Agent, or Firm*—Thorpe North & Western LLP (57) ABSTRACT

A pet-activated signaling device to allow a pet to signal a human includes a base, and a cover, associated with the base. A biasing element is operatively coupled between the base and the cover and is configured to provide a positive biasing force therebetween. At least one audio signaling system is associated with the base and the cover and is activatable in response to relative movement of the cover with respect to the base. At least one visual signaling system is associated with the base and the cover and is activatable in response to relative movement of the cover with respect to the base.

29 Claims, 5 Drawing Sheets

U.S. PATENT DOCUMENTS

| | | | |
|---|---|---|---|
| 5,475,369 A | 12/1995 | Baker | 340/573.3 |
| 5,604,478 A | 2/1997 | Grady et al. | 340/330 |
| 5,634,436 A * | 6/1997 | Coombs et al. | 119/707 |
| 5,705,990 A | 1/1998 | Messier | 340/666 |
| 5,764,132 A | 6/1998 | Hill | 340/321 |
| 6,019,066 A * | 2/2000 | Taylor | 119/720 |
| 6,094,139 A | 7/2000 | Moore | 340/573.1 |
| 6,445,302 B1 | 9/2002 | Vena | 340/573.3 |
| 6,698,381 B1 * | 3/2004 | Lynch | 119/51.02 |
| 6,722,318 B1 * | 4/2004 | Hotmer | 119/712 |

* cited by examiner

PET-ACTIVATED SIGNALING ASSEMBLY

Priority is claimed to U.S. Provisional Patent Application No. 60/470,482, filed May 13, 2003, which is hereby incorporated herein by reference.

BACKGROUND OF THE INVENTION

1. Field of the Invention

The present invention relates generally to signaling assemblies. More particularly, the present invention relates to signaling assemblies activatable by pets for signaling humans.

2. Related Art

Owners of pets often allow the pet to live primarily indoors and allow the pet to only occasionally exit the home unattended. The intervals at which the pet, such as a dog or a cat, are let outdoors are often dictated by the pet. For instance, many pets are well trained to relieve themselves only in the outdoors and so must be given frequent access to the outdoors according to the pet's biological needs. While pet doors and other devices have been provided that allow the pet to exit or enter the home at will, these devices are often problematic in that other, unwanted, animals or pets may use the doors to enter or leave the home. Such devices can also permanently alter doors and door frames, and many rental properties (i.e., apartments) disallow such devices for this reason. In addition, many pet owners may wish to limit the time a pet spends outdoors for considerations such as the pet's safety, nuisance noise the pet may generate, weather conditions, etc.

Due to these factors, many owners may rely on the pet to indicate when the pet wishes to enter or leave the home and personally attend to a door to let the pet into or out of the home. Because owners are often busy attending to other matters, they may not notice that a pet is standing by a door desiring to be let out or in. In such situations, the pet may become impatient and begin barking or otherwise creating noise, or, even more problematic, may begin scratching or pawing at the door in an effort to open the door or to signal to the owner the pet's desire to be let in or out. This can be problematic in that the pet can become a nuisance and can cause considerable damage to the door.

While pet activated signaling devices have been used in the past to allow a pet to indicate its desire to enter or exit a home, conventional pet signaling devices often must be permanently affixed to a housing structure. Permanent fixtures can be costly, due to the time and resources required for installation, and are prohibitive in that they cannot be easily moved and thereby used in connection with more than one door. Due to their immobile nature, conventional pet signaling devices cannot be used away from the home. Thus, in the case where a pet has been trained to use a signaling device, the pet may not have the opportunity to do so when taken on vacations, as the signaling device cannot be easily moved.

In addition, conventional pet signaling devices often utilize an audio signaling device that is remote from the signaling assembly. This can lead to more expensive and less reliable signaling systems, as the system includes a greater number of components and a correspondingly higher probability for failure of one or more components of the system. Also, audio signaling devices are limited in applications where either the human or the pet is hearing impaired.

SUMMARY OF THE INVENTION

It has been recognized that it would be advantageous to develop a signaling assembly that can be activated by a pet to indicate the pet's desire to be let into or out of a house or other dwelling. In addition, it has been recognized that it would be advantageous to develop a pet-activated signaling device that can produce a variety of signal types which can be varied according to a particular application.

The invention provides a pet-activated signaling device to allow a pet to signal a human, including a base, and a cover, associated with the base. A biasing element can be operatively coupled between the base and the cover to provide a positive biasing force therebetween. At least one audio signaling system can be associated with the base and the cover and can be activatable in response to relative movement of the cover with respect to the base. At least one visual signaling system can be associated with the base and the cover and can be activatable in response to relative movement of the cover with respect to the base.

In accordance with another aspect of the invention, a pet-activated signaling device to allow a pet to signal a human is provided, including a base having at least one base column extending upwardly therefrom and a cover, associated with the base and having at least one cover column extending downwardly therefrom. One of the base column and the cover column can extend into the other of the base column and cover column in an at least partially overlapping configuration. A biasing element can be coupled to each of the cover column and the base column between the base member and the cover member, and at least one audio signaling system can be activatable in response to relative movement of the cover with respect to the base.

In accordance with another aspect of the invention, a pet-activated signaling device to allow a pet to signal a human is provided, including a base, and a cover, associated with the base. A biasing element can be operatively coupled between the base and the cover to provide a positive biasing force therebetween. A selectively variable audio signaling system can be associated with the base and the cover and can be activatable in response to relative movement of the cover with respect to the base. The selectively variable audio signaling system can include means for varying one of: a volume of an audio signal produced by the device; a frequency of the audio signal produced by the device; and an audio pattern of the audio signal produced by the device. At least one visual signaling system can be associated with the base and the cover and can be activatable in response to relative movement of the cover with respect to the base. The visual signaling system can include means for selectively enabling the visual signaling system.

In accordance with another aspect of the invention, a pet-activated signaling device to allow a pet to signal a human is provided, including a base, and a cover, associated with the base. A biasing element can be operatively coupled between the base and the cover and can be configured to provide a positive biasing force therebetween. At least one signaling system can be associated with the base and the cover and can be activatable in response to relative movement of the cover with respect to the base to signal the human. All operable components of the signaling device can be coupled to one of the cover and the base to enable complete portability of the device.

Additional features and advantages of the invention will be apparent from the detailed description which follows,

DETAILED DESCRIPTION

Reference will now be made to the exemplary embodiments illustrated in the drawings, and specific language will be used herein to describe the same. It will nevertheless be understood that no limitation of the scope of the invention is thereby intended. Alterations and further modifications of the inventive features illustrated herein, and additional applications of the principles of the inventions as illustrated herein, which would occur to one skilled in the relevant art and having possession of this disclosure, are to be considered within the scope of the invention.

Figure 1:
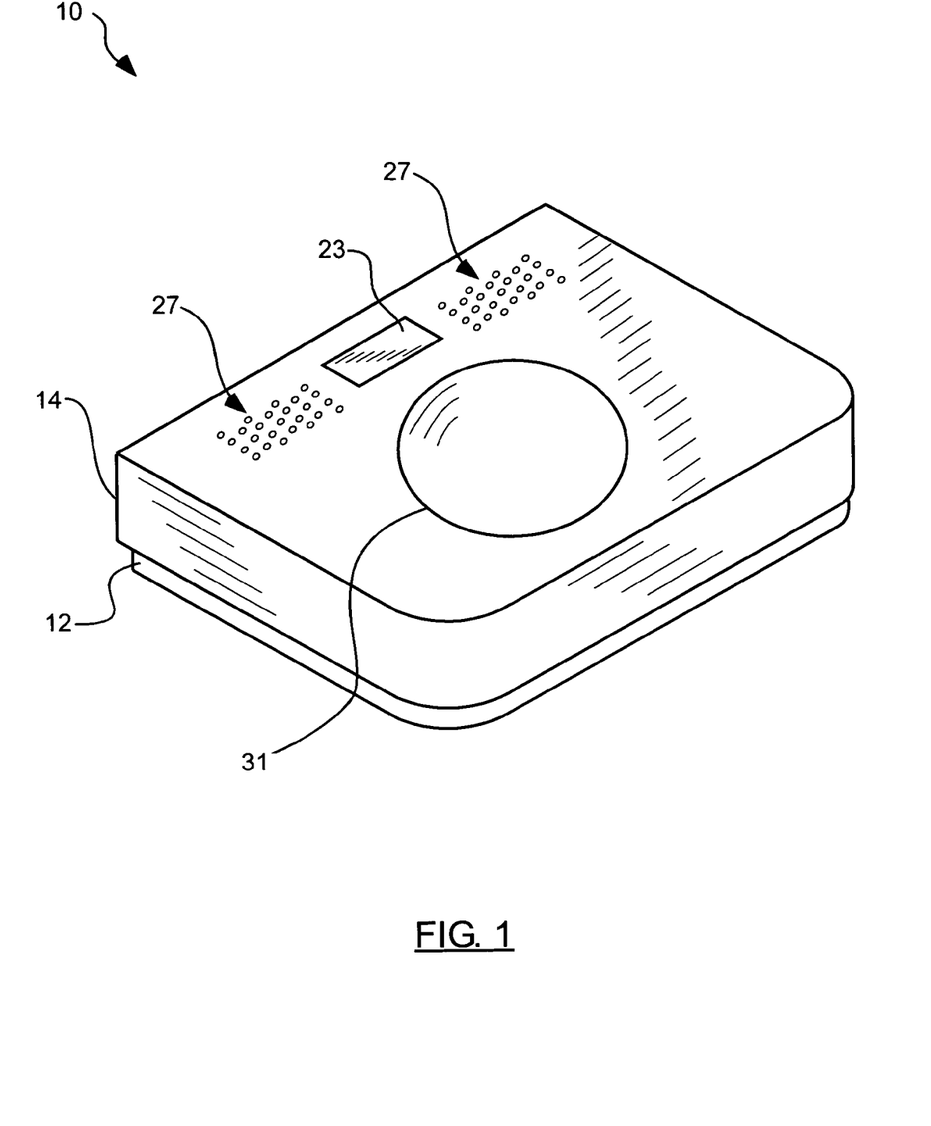
FIG. 1 is a perspective view of a pet-activated signaling device in accordance with an embodiment of the present invention.
Figure 2:
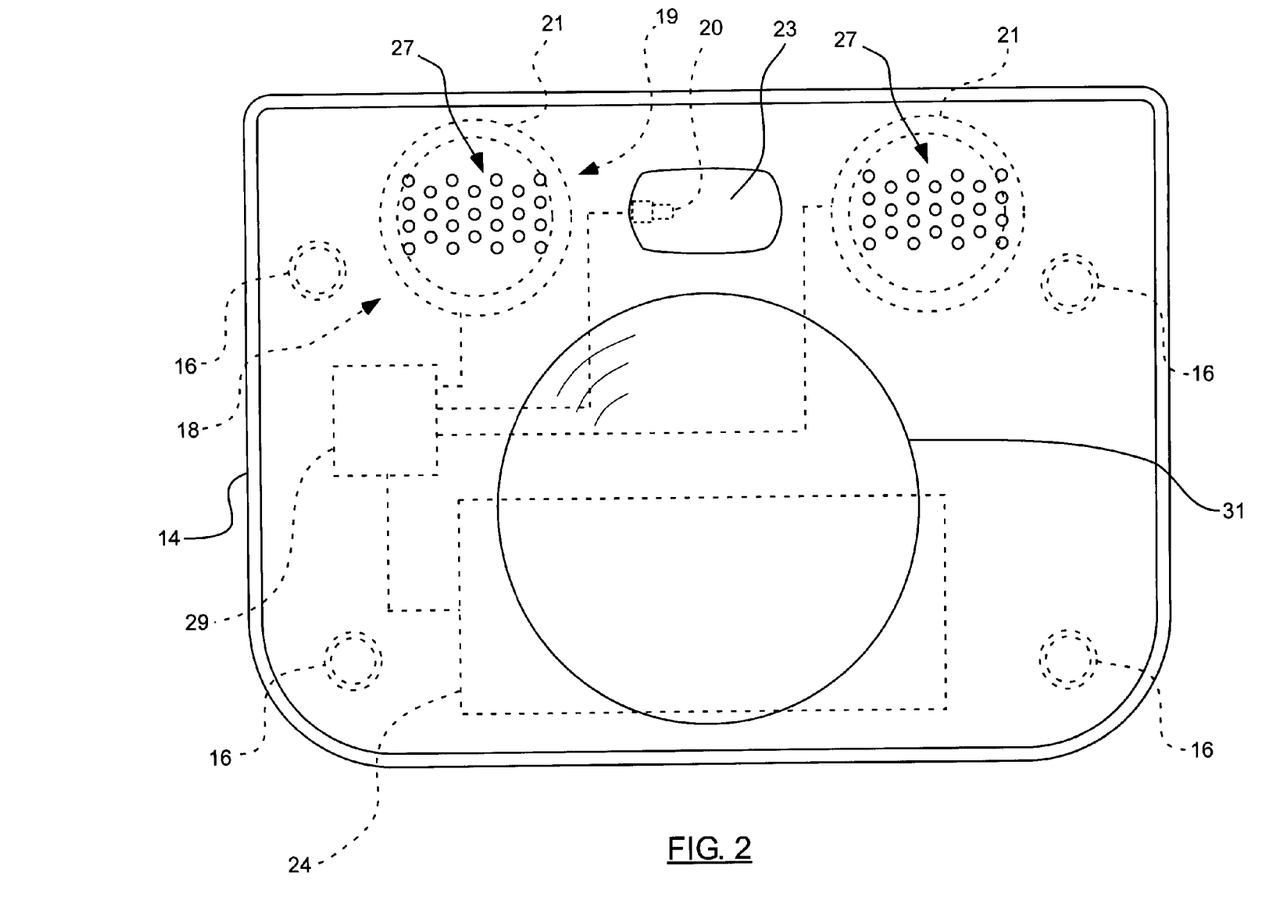
FIG. 2 is a top view of the cover of the signaling device of FIG. 1.
Figure 4:
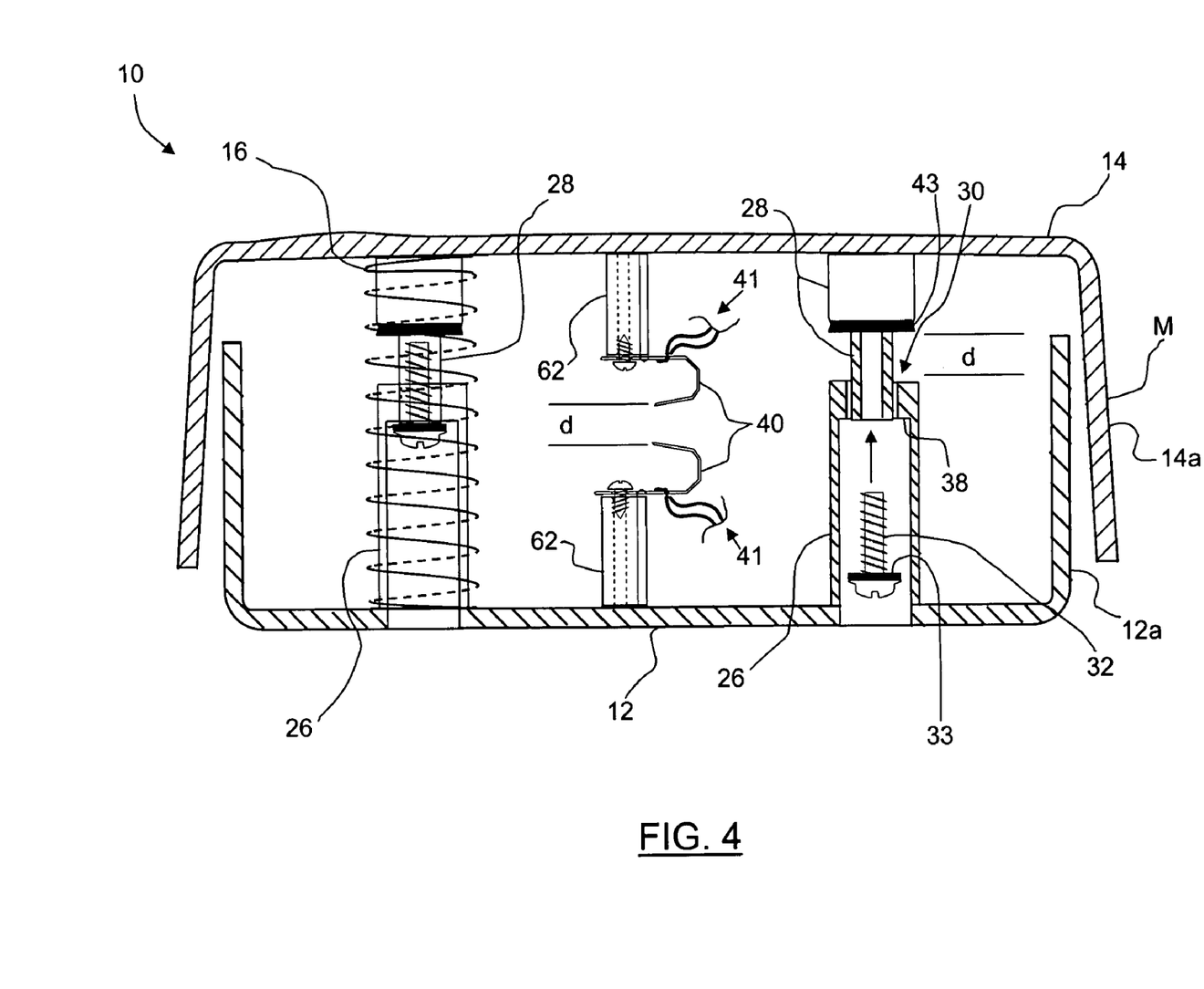
FIG. 4 is a side, partially sectioned view of the signaling device of FIG. 1.

As illustrated in FIGS. 1, 2 and 4, the invention provides a pet-activated signaling device, indicated generally at 10. The signaling device can include a base 12 and a cover 14, associated with the base. A biasing element (16 in FIG. 4) can be operatively coupled between the base and the cover and can be configured to provide a positive biasing force therebetween. As shown hidden in FIG. 2 (as below the cover in top view), at least one audio signaling system 18 can be associated with the base and the cover. The audio signaling system can be activatable in response to relative movement of the cover with respect to the base. At least one visual signaling system 19 can also be associated with the base and the cover and can also be activatable in response to relative movement of the cover with respect to the base. In the embodiment shown, the cover and base are moveable with respect to each and a pet activates the signaling device by depressing the cover relative to the base to activate the audio and/or visual signaling systems, as discussed in more detail below. A target protrusion 31 can extend upwardly from the cover to provide a positive interface between the device and a pet's paw.

The signaling device 10 can be utilized in a variety of applications for pets. In one aspect of the invention, the device can be disposed on a floor where a door (not shown) leads from one area to another, and a pet can activate the assembly by placing a paw on the cover and thereby depress the cover and biasing member until the various signaling systems are activated. Upon perceiving the activation of the signaling device, a human can be alerted to the fact that the pet wishes to enter or exit the door. The device can also be used for a variety of other applications; for example, the device can be placed near a pet's food or water bowl and the pet can signal when it requires food or water.

As discussed in more detail below, the device can include an integral power source and integral operational circuitry and can thus provide an integrated device that can be utilized without requiring installation into a building structure. In addition, the device can be formed of relatively few moving parts with relatively low weight. Thus, the signaling device can be lightweight and portable, and can be easily moved from one location to another by a human pet owner. In addition, the simple and efficient design of the signaling device provides for effective operation with few operative parts which may be susceptible to failure.

FIG. 2 illustrates further features of the invention. In this embodiment, the visual signaling system 19 can include a light source 20 configured to provide a visual signal to the human. The light source can be of a variety of types known to those in the art, including LED lights, incandescent lights, etc. The light source can be disposed beneath a transparent or translucent cover 23 to protect the light source and to aid in diffusing light produced by the light source. The visual signal provided by the present device can be advantageous in a number of ways. For example, some humans or pets that are hearing impaired cannot effectively utilize conventional pet signaling devices, as these device produce only an audible signal. The present device can be used in connection with pets or humans who are hard of hearing by selectively providing either or both an audio or visual signal. Also, it is believed that some pets are more easily trained to use the device with the aid of a visual signal, which may be less likely to startle the pet when activated.

Similarly, the audio signaling system 18 can include one or more audio transducers or speakers 21 that can be capable of producing multiple different audio signals. The audio transducers can be disposed under the cover 16 adjacent audio outlet apertures 27, which can allow the audio signal to more easily travel from the device. The different audio signals produced by the audio transducers can vary in a number of aspects, and in one embodiment can include signals differing in volume. In this manner, volume adjustments can be made by the owner commensurate with the size of the home, apartment or other type of dwelling in which the device is used. In addition the audio signal can be increased in volume when the device is used far from human activity, or in high noise areas, such as near a television. Also, the volume can be reduced during periods of relative quite, such as when humans have retired for the night, as sounds are more easily heard during these periods.

The different audio signals can also include signals that differ in frequency or pitch. This feature can be advantageous in that some pets may be more easily trained when using a signaling device that produces higher or lower pitched sounds. This feature is also advantageous when multiple signaling devices are used in near vicinity to each other. For example, if it is desired to use one signaling device near a front door of a home and another near a rear door of a home, the devices can be adjusted to produce different pitched sounds, so that a human can discern which device is being activated by the pet. Similarly, if one device is used near food and one near an exit of the home, the human can ascertain which signaling device the pet is activating.

To further aid in the case where multiple units are used in near vicinity, the different audio signals can include signals differing in audio pattern. As used herein, the term "audio pattern" is to be understood to refer to a pattern of tones, notes or cadences emitted by the audio system. For example, an audio pattern may consist of a series of equally pitched notes repeated a number of times at the same or differing rhythm. An audio pattern may also consist of a series of different notes organized into a recognizable tune. By providing a signaling device that offers differing audio patterns, the audio signal can be tailored to a particular pet or human preference.

As also shown in hidden view in FIG. 2 (as being disposed beneath cover 14), the device can include a power source 24 associated with the audio 18 and visual 19 signaling systems. The power source can take a variety of forms known to those in the art, including a battery power source, solar power source, etc. In this embodiment, the audio signaling system, the visual signaling system and the power source can each be disposed integrally within the base and cover. In this manner, the device provides an integrated unit that is operatively contained within the base and cover and does not require external emitters, speakers, mounting hardware, etc. In one aspect of the invention, substantially all operable components of the device can be disposed within an enclosure defined by the cover and the base. In this manner, all electronic components, mechanical components, biasing elements, lights, transducers, etc., can be integrated within the base and cover to provide a compact, stand-alone unit. The device can thus be easily moved or relocated from one location to another.

Controller 29 can also be disposed between the base 12 and the cover 14 to control the various circuitry required by the audio 18 and the visual 19 systems. The controller can encompass a variety of controller types, as are known to those skilled in the art. In addition, various switches and sub-circuits can be incorporated into the device to provide control of each of the signaling components utilized.

Turning now to FIG. 4, in one aspect of the invention, the base 12 can include at least one base column 26 extending upwardly therefrom. Similarly, the cover 14 can include at least one cover column 28 extending downwardly therefrom. One of the base column and the cover column can extend into the other of the base column and cover column in an at least partially overlapping configuration. In the embodiment shown, the base column 26 includes an aperture 30 formed in a top thereof through which cover column 28 can at least partially extend. In this manner, the columns are allowed to move relative to each other while being restrained in a near collinear, overlapping relationship. The cover and base are thus held in a secure relationship to each other while allowing the base and cover to move vertically with respect to each other. While the cover column is shown extending into the base column, it is contemplated that the relationship can be reversed, with the base column extending into the cover column.

As also shown in FIG. 4, device can also include means for retaining one of the cover column 28 and the base column 26 within at least a portion of the other of the cover column and base column, in order to retain the cover column and base column in the at least partially overlapping configuration while allowing relative movement of the cover with respect to the base. The means for retaining can include one or more threaded fasteners 32 which can pass partially through the aperture 30 in the base column and engage the cover column. As illustrated, the threaded fastener 32 can have a head 33 that is larger in diameter than the aperture 30 such that, when engaged within the base column, the threaded fastener limits upward movement of the cover at the point where the head of the fastener contacts an underside 38 of the base column adjacent the aperture.

Thus, when the unit is in a "neutral" position, the biasing elements 16 provide a positive force between the base 12 and cover 14 and force the threaded fastener 33 engaged within the cover column 28 against the underside 38 of the top of the base column 26. To activate the device, a pet places a paw on the device, causing the cover to move relative to the base: in the case shown, in a downward deflection. The cover column thus moves downwardly within the base column until contact points 40 engage. At this point, the various audio and/or visual signaling systems are activated and the device emits selected audio and/or visual signals. Once the pet removes its paw from the device, the one or more biasing elements force the return of the base and the cover into the neutral position, where the contact points are no longer engaged and the signaling systems are neutralized.

It will be appreciated that pets may apply force to the device from a number of directions and in a variety of force magnitudes. To aid in absorbing or dampening some of the forces applied to the device by pets, cushioning means can be disposed between at least a portion of the cover and base columns, 28 and 26, respectively. In the aspect shown, the cushioning means includes rubber grommets or washers 43 disposed in the area where the cover column and base column can contact each other. The cushioning means can also be placed in a variety of locations and can be of a variety of types, including mechanical springs, and washers made from a variety of materials.

To aid in restraining the cover 14 and the base 12 in substantially vertical travel, the biasing element 16 can comprise a substantially cylindrical spring extending from substantially a top surface of the base to substantially a bottom surface of the cover. In the example shown in FIG. 4, the biasing element circumscribes each of the cover column 28 and the base column 26 in the at least partially overlapping configuration (note that the biasing element associated with the rightmost pair of columns is omitted from FIG. 4 in the interests of clarity). Also, in one embodiment of the invention, the cover can include an outer wall 14a and the base can include an inner wall 12a. The inner wall of the base can extend upwardly within the outer wall of the cover to a position above a midpoint M of the outer wall. In this manner, the cover and base are further restrained from moving laterally with respect to each other, which may otherwise result in the cover and base becoming separated from each other, leading to inoperability of the device as a whole.

Figure 3:
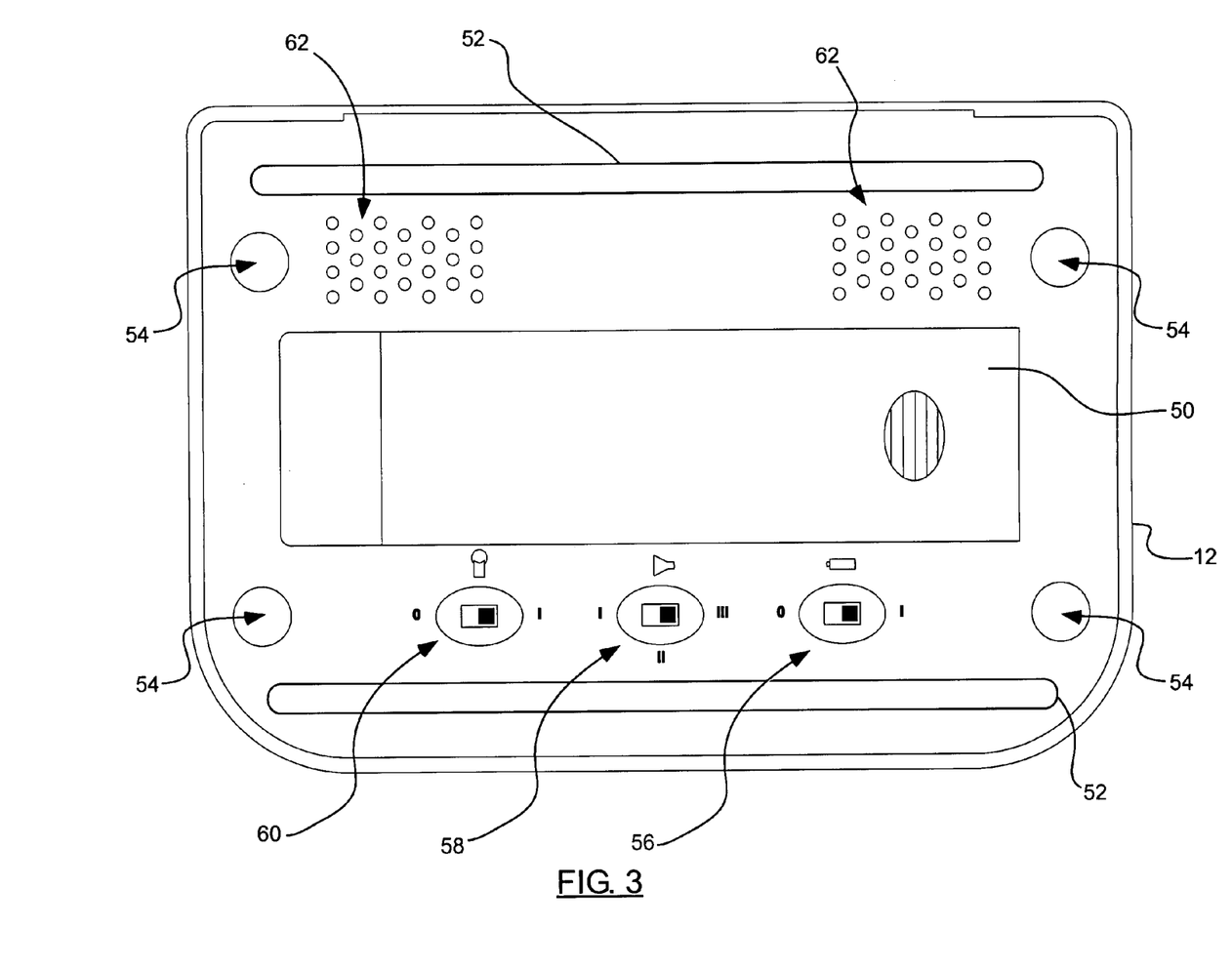
FIG. 3 is a bottom view of the base of the signaling device of FIG. 1.

Further aspects of the invention are shown in FIG. 3, which illustrates the base 12 in bottom view. The base can include a compartment 50 which can house, for example, batteries (not shown) to be used as the power source. One or more frictional engagement strips 52 can be attached to or engaged with the base to serve to limit "skidding" of the base in response to pressure applied by a pet's paw. Access holes 54 can provide access where threaded fasteners (not shown in FIG. 3) can be engaged through the base and into the cover (not shown in FIG. 3). Also, audio apertures 62 can be provided in the base to allow the audio signals to travel more easily through the base.

A series of switches or similar control components can be associated with the base, including master power switch 56, which can enable and disable the entire device; volume and/or pitch control switch 58, which can alter the character of the audio signal; and visual signal enabling switch 60, which can allow a human to enable and/or disable the visual signal system. In this manner, the device can include both a selectively variable audio signaling system and at least one visual signaling system. The audio system can thus include means for varying one of: a volume of an audio signal produced by the device; a frequency of the audio signal produced by the device; and an audio pattern of the audio signal produced by the device. Similarly, the visual signaling system can thus include means for selectively enabling the visual signaling system.

Figure 6:
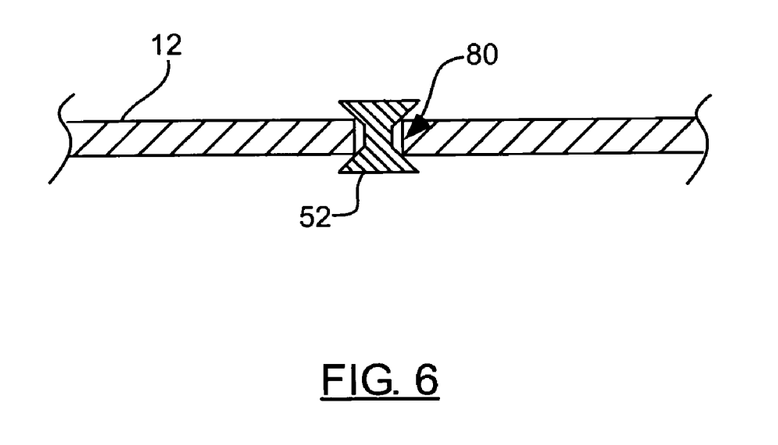
FIG. 6 is a partial, sectioned side view of the base of the signaling device of FIG. 1, including a frictional interface strip engaged with the base.

FIG. 6 illustrates one aspect of the invention wherein the frictional engagement strip 52 includes a cross section having a reduced section near the center of the strip, as referenced from an end of the strip. The frictional engagement strip can be forced into a slot 80 formed in the base 12 to secure the strip within the base. In this manner, the frictional engagement strip can be secured within the base to limit separation of the strip from the base. It is believed that frictionally engaging the strip 52 within the slot 60 results in a more secure interface between the strip and the base than might otherwise be achieved with other attachment mechanisms, such as with adhesive attachment means. The frictional engagement strip can be formed of a variety of materials, including rubber, polymers, gels, etc.

Figure 5:
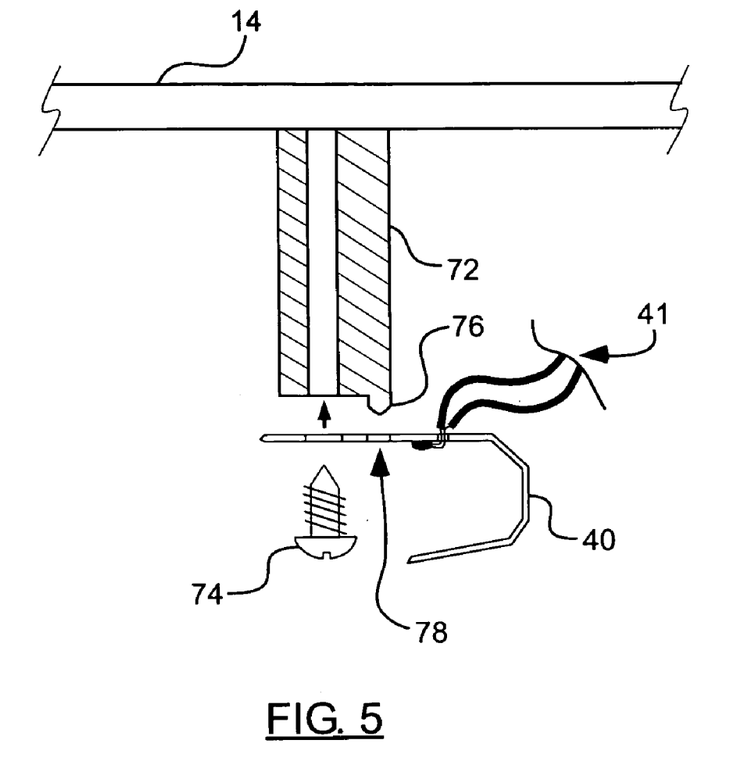
FIG. 5 is a partial, sectioned side view of the cover of the signaling device of FIG. 1, including a contact mounting post in accordance with one aspect of the invention.

FIG. 5 illustrates in more detail one contact point assembly in accordance with one aspect of the invention. In this embodiment, one of a pair of contact points 40 (the other of the pair not shown for simplicity) is coupleable to a contact support post 72 via threaded fastener 74. The contact support post can include an alignment protrusion 66 which can correspond to alignment aperture 78 formed in the contact point. In this manner, as the contact point is secured to the contact support post, the alignment protrusion ensures that the contact point remains in proper position to contact the corresponding structure which closes the signaling circuit upon contact. This feature is advantageous in that the signaling device may be subject to relatively rough treatment by pets which can result in the relatively sensitive contact points being dislodged from proper position and render the device unusable. As will be appreciated, contact points 40 can include connecting wiring 41 which can integrate the contact points within the various audio and visual signaling systems.

It is to be understood that the above-referenced arrangements are illustrative of the application for the principles of the present invention. It will be apparent to those of ordinary skill in the art that numerous modifications can be made without departing from the principles and concepts of the invention as set forth in the claims.

What is claimed is:

1. A pet-activated signaling device to allow a pet to signal a human, comprising:
   a base;
   a cover, associated with the base;
   a biasing element, operatively coupled between the base and the cover and being configured to provide a positive biasing force therebetween;
   at least one audio signaling system, associated with the base and the cover and being activatable in response to relative movement of the cover with respect to the base; and
   at least one visual signaling system, associated with the base and the cover and being activatable in response to relative movement of the cover with respect to the base;
   wherein the audio and visual signaling systems each include a switch to allow the human to selectively enable each of the audio and visual signaling systems.

2. The device of claim 1, wherein the visual signaling system includes a light source configured to signal to the human.

3. The device of claim 1, wherein each switch is accessible by the human when the cover is disposed over the base.

4. The device of claim 1, wherein the audio signaling system includes an audio transducer capable of producing multiple different audio signals.

5. The device of claim 4, wherein the different audio signals include signals differing in volume.

6. The device of claim 4, wherein the different audio signals include signals differing in frequency.

7. The device of claim 4, wherein the different audio signals include signals differing in audio pattern.

8. The device of claim 1, wherein the cover includes an outer wall and the base includes an inner wall, and wherein the inner wall of the base extends upwardly within the outer wall of the cover to a position above a midpoint of the outer wall.

9. The device of claim 1, further comprising a power source associated with the audio and visual signaling systems, and wherein the audio signaling system, the visual signaling system and the power source are each disposed integrally within the base and cover.

10. The device of claim 9, wherein all operable components of the device are disposed within an enclosure defined by the cover and the base.

11. The device of claim 10, wherein the device is relocatable.

12. A pet-activated signaling device to allow a pet to signal a human, comprising:
    a base having at least one base column extending upwardly therefrom;
    a cover, associated with the base and having at least one cover column extending downwardly therefrom;
    one of the base column and the cover column extending into the other of the base column and cover column in an at least partially overlapping configuration;
    a biasing element, coupled to each of the cover column and the base column between the base member and the cover member; and
    at least one audio signaling system, activatable in response to relative movement of the cover with respect to the base.

13. The device of claim 12, further including means for retaining one of the cover column and the base column within at least a portion of the other of the cover column and base column to retain the cover column and base column in the at least partially overlapping configuration while allowing relative movement of the cover with respect to the base.

14. The device of claim 12, wherein the biasing element comprises a substantially cylindrical spring extending from substantially a top surface of the base to substantially a bottom surface of the cover.

15. The device of claim 12, wherein the biasing element circumscribes each of the cover column and the base column in the at least partially overlapping configuration.

16. The device of claim 12, wherein the cover includes an outer wall and the base includes an inner wall, and wherein the inner wall of the base extends upwardly within the outer wall of the cover to a position above a midpoint of the outer wall.

17. The device of claim 12, further comprising at least one visual signaling system, associated with the base and the cover and being activatable in response to relative movement of the cover with respect to the base.

18. The device of claim 17, wherein the audio and visual signaling systems each include a switch to allow the human to selectively enable each of the audio and visual signaling systems.

19. The device of claim 12, wherein the audio signaling system includes an audio transducer capable of producing multiple different audio signals.

20. The device of claim 19, wherein the different audio signals include signals differing in one of: volume; frequency; and audio pattern.

21. The device of claim 12, further comprising cushioning means, disposed between at least a portion of the cover and base columns for dampening impact forces between the cover and base columns.

22. A pet-activated signaling device to allow a pet to signal a human, comprising:
- a base;
- a cover, associated with the base;
- a biasing element, operatively coupled between the base and the cover and being configured to provide a positive biasing force therebetween;
- a selectively variable audio signaling system, associated with the base and the cover and being activatable in response to relative movement of the cover with respect to the base, the selectively variable audio signaling system including means for selectively varying one of: a volume of an audio signal produced by the device; a frequency of the audio signal produced by the device; and an audio pattern of the audio signal produced by the device; and
- at least one visual signaling system, associated with the base and the cover and being activatable in response to relative movement of the cover with respect to the base, the visual signaling system including means for selectively enabling the visual signaling system.

23. The device of claim 22, wherein the visual signaling system includes a light source configured to signal to the human.

24. The device of claim 22, further comprising a power source associated with the audio and visual signaling systems, and wherein the audio signaling system, the visual signaling system and the power source are each disposed integrally within the base and cover.

25. The device of claim 22, further comprising:
- at least one base column extending upwardly from the base;
- at least one cover column extending downwardly from the cover; and wherein
- one of the base column and the cover column extend into the other of the base column and cover column in an at least partially overlapping configuration.

26. The device of claim 25, further including means for retaining one of the cover column and the base column within at least a portion of the other of the cover column and base column to retain the cover column and base column in the at least partially overlapping configuration while allowing relative movement of the cover with respect to the base.

27. The device of claim 22, wherein the biasing element comprises a substantially cylindrical spring extending from substantially a top surface of the base to substantially a bottom surface of the cover.

28. The device of claim 25, wherein the biasing element circumscribes each of the cover column and the base column in the at least partially overlapping configuration.

29. A pet-activated signaling device to allow a pet to signal a human, comprising:
- a base;
- a cover, associated with the base;
- a biasing element, operatively coupled between the base and the cover and being configured to provide a positive biasing force therebetween;
- at least one signaling system, associated with the base and the cover and being activatable in response to relative movement of the cover with respect to the base to signal the human; and
- the cover and the base being coupled to one another at a location that is circumscribed by the biasing element;
- wherein all operable components of the signaling device are coupled to one of the cover and the base to enable complete portability of the device.

* * * * *